Figure 2:
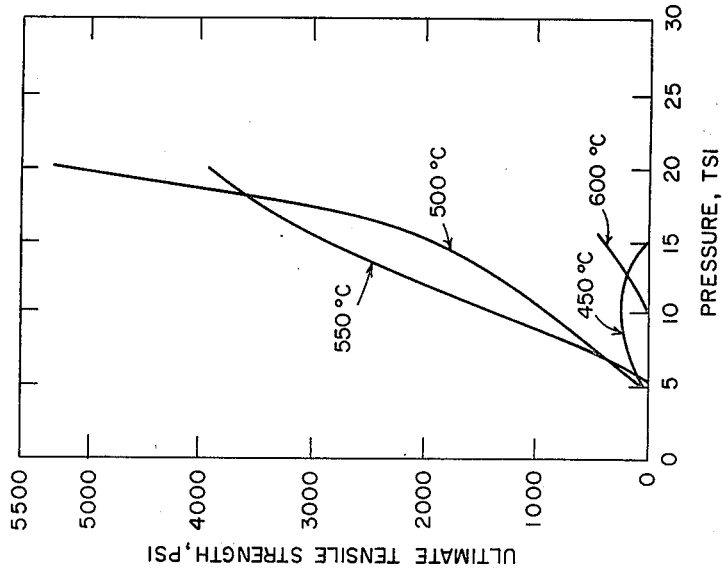

INVENTOR.
SAMUEL STORCHHEIM

United States Patent Office 2,914,847
Patented Dec. 1, 1959

2,914,847
SOLID STATE BONDING OF THORIUM WITH ALUMINUM

Samuel Storchheim, Kingston, Pa., assignor to the United States of America as represented by the United States Atomic Energy Commission Application March 28, 1958, Serial No. 725,473

8 Claims. (Cl. 29—473.3)

The present invention relates to the solid state bonding of thorium with aluminum. More particularly, it relates to a method of forming a strong metallurgical bond between thorium and aluminum wherein said bond is stable at high temperatures and through a relatively large temperature gradient.

The problems of bonding thorium with aluminum is a difficult task because of the dissimilar nature of the two metals. Bonded thorium-aluminum products have been produced, but they lack the necessary thermal stability for service at elevated temperatures. Trouble is experienced in the form of warpage, weld breakage at closures and separation of the bond. These difficulties are probably due to the large differences in the thermal expansion and heat conductivity between these two metals. For example, the thermal expansion coefficient for thorium in the temperature range 30 to 1000° C. is about $12.5 \times 10^{-6}$ per degree C. while the thermal expansion coefficient for aluminum in the same temperature range is about $28 \times 10^{-6}$ per degree C.; the thermal conductivity for thorium at 500° C. is .102 calorie per second per centimeter per degree C., while the thermal conductivity of aluminum at 400° C. is about .55 in the same units.

Another difficulty encountered in bonding thorium with aluminum is the relatively rapid growth of layers of brittle, intermetallic compounds of thorium and aluminum at the bond interface. It is extremely difficult to control the extent to which the brittle intermetallic compounds form at the bond interface; yet if this layer is not controlled, whatever bond may be formed is so weak as to be substantially useless.

It is accordingly one of the objects of this invention to overcome these difficulties by controlling the formation of brittle, intermetallic compounds at the bond interface.

It is another object of the present invention to provide a method for reducing the deformation of such brittle, intermetallic compounds.

A prime object of the present invention is to provide a method of joining thorium and aluminum by a strong, adherent metallurgical bond.

Still another object is to provide a method of forming a bond between thorium and aluminum which is strong and adherent even at relatively high temperatures and through relatively large temperature gradients.

Another object of the present invention is to provide a method of forming an adherent clad of aluminum over a solid core of thorium.

With these and other objects in mind, the present invention comprises placing clean surfaces of thorium and aluminum in contact with each other and hot pressing the metals together in an inert atmosphere or under vacuum to form a bond therebetween. I have discovered that by hot pressing at a temperature in the range of about 375 to 575° C. a strong, adherent bond is obtained.

Figure 1:
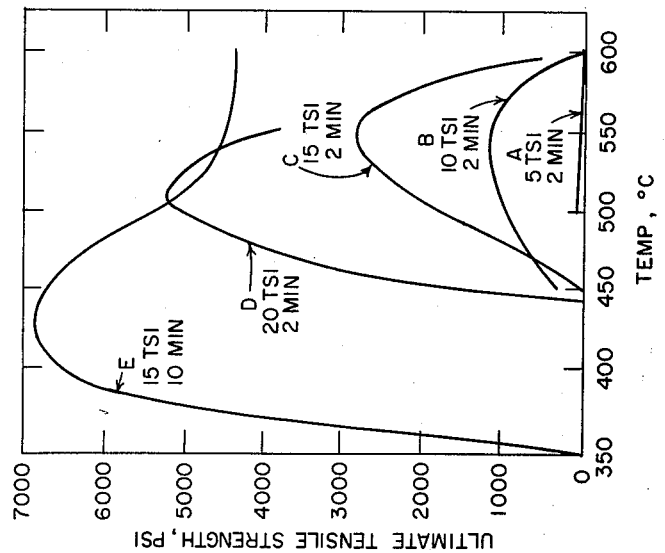

The method of my invention will be more fully understood by a consideration of the accompanying Figures 1 and 2 which illustrate the influence of temperature (Figure 1) and of pressure (Figure 2) on the ultimate tensile strength of the bonds formed. The significance of the curves illustrated in the figures will become apparent as the description of the invention proceeds.

The following general procedure was used in carrying out the method of my invention, it being understood that many alternatives may be employed without departing from the essence of my invention.

*Materials used*

The materials used were 2S aluminum and bars either of reguline thorium metal or of hot-pressed powder thorium. The composition of the reguline thorium used was as follows:

| | Percent by weight |
|---|---|
| Be | 0.1–1.0 |
| Ca | 0.0001–0.001 |
| Cr | 0.001–0.01 |
| Cu | 0.0001–0.001 |
| Fe | 0.01–0.1 |
| Mg | 0.0001–0.001 |
| Mn | 0.0001–0.001 |
| Na | 0.0001–0.001 |
| Si | 0.01–0.1 |
| N | 0.017 |
| O | 0.11 |
| C | 0.05–0.06 |
| Th | balance |

The powder-metallurgy thorium used in the experiments was obtained by forming the hydride of reguline thorium chips or bar stock, decomposing the hydride and subsequently comminuting to −80-mesh size. The method used for the preparation and consolation of thorium and thorium hydride powders is disclosed in an AEC publication, SEP–168, dated August 9, 1954, and declassified December 27, 1956. The powder was hot-pressed in vacuo at 650° C. and 12 t.s.i. (tons/sq. in.) for a period of 15 minutes. The resultant density of slugs or bars so fabricated was about 11.5 g./cm.³.

The specimens used were arranged in tensile and diffusion couples such that cylindrical thorium slugs ¼ in. thick were sandwiched between aluminum cylinders 1 inch long and of diameter equal to the thorium slugs. These couples were, in turn, slipped into an aluminum sleeve having a 30-mil wall. The object of this sleeve was to line up the metal pieces and keep contaminants from falling into or being entrapped at the aluminum-thorium interfaces. The diameter of each tensile couple used was 1.440 inches.

The contacting interfaces of the aluminum and thorium pieces were abraded clean prior to assembly and insertion into the aluminum sleeve. Alternatively the aluminum may be chemically cleaned as follows:

(1) Degrease in acetone.
(2) Rinse in water.
(3) Immerse 5 minutes in 10 percent NaOH at 70° C.
(4) Rinse in water.
(5) Immerse 2 minutes in 50 percent HNO₃ at room temperature.
(6) Rinse in water.
(7) Dry with paper tissue.

The thorium slugs were either hand abraded or dry machined prior to insertion in the cleaned aluminum can.

*Equipment and hot-pressure-welding technique*

An apparatus which can be used for the hot-pressure bonding of thorium and aluminum, as well as for the cladding or canning of thorium slugs, is described in "Solid State Bonding of Aluminum to Nickel," Journal of Metals, vol. 6: 269–274 (February 1954), by S. Storchheim, J. L. Zambrow, and H. Hausner. The specimens to be hot pressed were inserted into an aquadaglubricated Inconel-X die containing two thermocouple wells. The die, in turn, was placed in a heating unit consisting of three individually controlled windings. This assembled unit was in turn placed in a stainless-steel, water-cooled pot. A cover was bolted onto the pot, and the entire apparatus was evacuated to less than 5 microns Hg pressure. The three windings were energized, and the specimens in the die were brought to the desired temperature.

At this point pressure was applied to a ram in the top cover, the ram being movable through a Wilson seal. At the end of the desired pressing time, the pressure was released and the current to the furnace was cut off. The maximum pressure within the system (caused by outgassing) was on the order of about 400 microns which, by the time pressing was initiated, had been restored to below 5 microns. The length of heat-up time varied between 45 and 90 minutes. The time for ejection of hot-pressed specimens was on the order of 3 to 5 minutes after pressure and furnace current had been turned off.

Testing technique

After a hot-pressed specimen was ejected from the die, the outer aluminum sleeve was machined off, and the aluminum ends of the couple were threaded. The specimen in this condition was then tested in a tensile strength apparatus. The force necessary to separate the bond was recorded, and from this the ultimate tensile strength in pounds per square inch was calculated. In all cases, fracture occurred at one of the aluminum-thorium interfaces. The aluminum-thorium interface which remained intact was sectioned and microscopic measurements were made to determine the rate of formation of the intermetallic alloy zone.

Effect of hot-pressing temperature and pressure

Figure 1 shows the relation between ultimate tensile strength and hot-pressing temperature for the isobars 5, 10, 15 and 20 t.s.i. held 2 minutes in vacuo. Curves A through D for these pressures respectively were obtained from couples of aluminum and reguline thorium; curve E was obtained from hot-pressed thorium and aluminum. As shown in Figure 1, almost no bond strength was obtained for the specimens pressed at 5 t.s.i. With increasing pressure for the remaining three isobars, tensile strength increased sharply with temperature, reached a maximum and then decreased sharply. As the pressure was increased, greater peak tensile strengths were obtained, and the approximate temperature where the peak occurred shifted to lower values. The highest tensile strength for the reguline thorium-aluminum couple was approximately 5300 p.s.i., occurring at about 500° C. at 20 t.s.i. A maximum strength of approximately 6800 p.s.i. was obtained at about 425° C. for the couples made of powder metallurgy thorium and aluminum.

Figure 2 shows how increasing pressure affects the ultimate tensile strengths of the bonds. Four curves are depicted for the isothermals 450, 500, 550 and 600° C. For this series of experiments, pressure was again maintained for 2 minutes, and reguline thorium was bonded to aluminum. Little bonding was obtained at 450° C., but the bond strengths increased with great rapidity at both 500 and 550° C. At 600° C., bond strengths were again quite low. The maximum strength obtained at the highest indicated pressure, namely, 20 t.s.i., was 5300 p.s.i. at 500° C. I have found that there is no appreciable increase in tensile strength at higher pressures than 20 t.s.i.

In another experiment, powder-metallurgy thorium was used to form the couples, and the pressure was held 10 minutes in vacuo at 550° C. At this temperature, bond strength was increased only nominally with increasing pressure. The maximum value that was attained was approximately 5000 p.s.i. at about 16 t.s.i.

To determine the effect of time on bond strength, a number of reguline thorium-aluminum and powder-metallurgy thorium-aluminum couples were formed by hot pressing at 575° C. at 15 t.s.i. pressure for varying times ranging from 1 minute to more than 30 minutes. In both cases no bonding occurred for hot pressing time of less than 2 minutes; tensile strength of both couples increased rapidly in the period from 2 to 5 minutes. In the case of the reguline thorium-aluminum couples, tensile strength increased from 2000 p.s.i. at 2 minutes to about 5000 p.s.i. at 5 minutes and reached a maximum value of about 7000 p.s.i. at the end of 20 minutes. The powder-metallurgy thorium-aluminum couple had a strength of about 3500 p.s.i. at the end of 5 minutes, 5000 p.s.i. at the end of 10 minutes and reached a maximum of approximately 7000 p.s.i. in 30 minutes. For both types of solid thorium, I found there was no appreciable increase in bond strength for hot-pressing times exceeding 30 minutes.

In a series of experiments, powder-metallurgy thorium and reguline thorium was bonded to 2S aluminum specimens by hot pressing at 500° C. in vacuo at pressures of from 10 to 20 t.s.i. In both cases (reguline and powder-metallurgy thorium) one thick and one thin intermetallic alloy layer formed. The thickness of the alloy zones was considerably greater for the specimens pressed at 20 t.s.i. than for those pressed at 10 t.s.i. Under polarized light, the thin intermetallic zone appears to consist of columnar grains. Hot-pressed powder-metallurgy thorium and aluminum interfaces showed similar microstructure as did reguline thorium and aluminum.

I have found that bond strengths begin to decrease at hot-pressing temperatures over 550° C. and decline rapidly at hot-pressing temperatures exceeding about 575° C. The decreased bond strength was apparently due to an increased rate of formation of a brittle, intermetallic zone at the bond interface. Through microscopic examination and measurement, it was found that the thickness as well as the rate of increase of thickness of the intermetallic layer was considerably greater at temperatures over 575° C. than at lower temperatures. Figure 2 illustrates the fact that the tensile strength of the bond is substantially less at the 600° C. hot-pressing temperature as compared to a bond formed at 500° C. or 550° C. over the same range of pressure. The optimum bonding temperature in the case where reguline thorium is used is between 500 and 575° C.; when powder-metallurgy thorium is used, the optimum bonding temperature is between 400 and 450° C.

The critical conditions necessary for bonding reguline thorium and aluminum as derived from these experiments were applied to the cladding of thorium slugs 6 inches in length by 1 inch in diameter in aluminum cans having a wall thickness of .035 inch. Temperatures ranging between 500 and 550° C. at pressures ranging from 12 to 25 t.s.i. were used with a die having its internal wall lubricated with molybdenum disulphide. Hot pressing was accomplished under vacuum conditions for a time of about 10 minutes.

The bond strengths of the aluminum-clad thorium slugs were found to be excellent as determined by several tests. In one case, the canned thorium specimens were deliberately ruptured by boring several holes through the aluminum cladding and into the thorium slug. The specimens were then heated in a steam-filled autoclave at 170° C. for 15 hours. No noticeable distortion of the aluminum was apparent about the holes in the cladding, indicating an excellent bond strength between the components of the bond.

In another test, the canned specimens were thermally shocked by heating them to 500° C. and quenching them in water at 20° C. After each thermal shock the specimens were checked by ultrasonic inspection equipment designed to detect failures in bonding. In no case was any unbonding observed for these specimens, even after many heating and quenching cycles.

It will, therefore, be apparent that by my invention I provide a method of joining thorium and aluminum to produce a bond which is strong and serivecable at relatively high temperatures, for example, of the order of 170° C. One important feature of my invention is that it includes a critical range of temperature and certain pressures and times at pressure necessary to bond thorium to aluminum even though the metals are so dissimilar.

Another important feature of my invention is that it makes possible the careful control and inhibition of intermetallic compounds at the bond interface between aluminum and thorium.

Still another advantage of my invention is that the brittle, intermetallic compound at the bond interface is not deformed during the bonding process since the intermetallic layer is not subjected to any substantial shear forces during hot pressing.

A particular advantage of my invention is realized when bonds are formed using powdered compacts of thorium. This is apparent from the curves of Figure 1.

Since many embodiments might be made in the present invention and since many changes might be made in the embodiment described, it is to be understood that the foregoing description is to be interpreted as illustrative only and not in a limiting sense.

I claim:

1. A method of bonding thorium and aluminum which comprises placing clean surfaces of thorium and aluminum in contact with each other and hot pressing the metals together in a protective atmosphere at a temperature in the range of about 375 to 575° C. and a pressure of at least about 10 t.s.i. to effect a bond therebetween.

2. A method of bonding thorium and aluminum which comprises placing clean surfaces of thorium and aluminum in contact with each other and hot pressing the metals together in a protective atmosphere at a temperature in the range of about 375 to 575° C. and simultaneously pressing the specimens together at a pressure of at least about 10 t.s.i. for a period of at least 2 minutes to effect a bond therebetween.

3. A method of bonding reguline thorium and aluminum which comprises placing clean surfaces of reguline thorium and aluminum in contact with each other and thereafter subjecting the contacted metals to a simultaneous pressure and heat treatment, said pressure being between about 10 and 20 t.s.i. and said temperature being between 500 and 575° C. to effect a bond therebetween.

4. A method of bonding reguline thorium and aluminum which comprises placing clean surfaces of reguline thorium and aluminum in contact with each other and thereafter subjecting the contacted metals to a simultaneous pressure and heat treatment, said pressure being between about 10 and 20 t.s.i. and said temperature being between 500 and 575° C. for a time of between 2 and 30 minutes to effect a bond therebetween.

5. A method of forming an aluminum cladding on a solid core of thorium which comprises enclosing solid thorium in a sheath of aluminum in contact with the thorium and subjecting the contacted metals to a simultaneous pressure and heat treatment under a protective atmosphere, said pressure being between about 10 and 20 t.s.i. and said temperature being between 375 and 575° C. to bond the metals.

6. A method of cladding thorium with aluminum which comprises contacting a solid thorium with a sheath of aluminum and subjecting the contacted metals to a simultaneous pressure and heat treatment, said pressure being between about 10 and 20 t.s.i. and said temperature being between 550 and 575° C. for a time varying between 2 and 30 minutes to bond the metals.

7. A method of bonding thorium to aluminum which comprises hot pressing thorium powder to form a densified thorium compact, contacting the surface of said compact with aluminum and thereafter hot pressing the contacted metals in a protective atmosphere at a temperature in the range 375 to 575° C. and at a pressure of at least 10 t.s.i. to effect a bond therebetween.

8. A method of bonding thorium to aluminum which comprises hot pressing thorium powder to form a densified thorium compact, contacting the surface of said compact with aluminum and thereafter hot pressing the contacted metals in a protective atmoshere at a temperature in the range 375 to 575° C. and at a pressure of at least 10 t.s.i. for a period of time from 2 to 30 minutes to effect a bond therebetween.

References Cited in the file of this patent

UNITED STATES PATENTS

| 2,820,751 | Saller | Jan. 31, 1958 |
| 2,837,818 | Storchheim | June 10, 1958 |

FOREIGN PATENTS

| 745,511 | Great Britain | Feb. 29, 1956 |

OTHER REFERENCES

Hampel; Rare Metals Handbook, Reinhold Publ. Co., N.Y., 1954, pages 427–440.

BMI-1022, July 1955.

International Conference on Peaceful Uses of Atomic Energy, 1955, vol. 9, pp. 203–207.